3,674,594
METHOD OF MANUFACTURING A MATERIAL
SIMILAR TO TEXTILE, CONTAINING PAPER
Leif R. Persson, Billingsfors, Sweden, assignor to AB
Billingsfors-Langed, Billingsfors, Sweden
No Drawing. Filed May 8, 1969, Ser. No. 823,151
Claims priority, application Sweden, May 29, 1968,
7,219/68
Int. Cl. B32b 31/00
U.S. Cl. 156—299   7 Claims

ABSTRACT OF THE DISCLOSURE

This invention relates to production of a substitute for textile material. The invention comprises the steps of impregnating and/or coating porous fibre material preferably selected from the group consisting of (1) soft crepe tissue paper having a surface weight of 10–50 g./m.$^2$ and a crepe degree of 10–50%, and (2) nonwoven fabric, for example having a surface weight of 10–50 g./m.$^2$, with an adhesive resinous elastomer in molten state, preferably comprising a plasticized mixture of hydrocarbon resin, for example low molecular styrene resin and resins of low molecular polythene or ethylene vinyl acetate copolymer type, forming an adhesive layer of said resinous elastomer on the surface of said porous fibre material and subsequently covering said adhesive layer on one or both sides by pressing said layer together with stretchable, porous tissue paper, preferably crepe tissue paper, having a surface weight of 10–50 g./m.$^2$ and a crepe degree of 10–50%, or fibres or cellulose or of synthetic character which are blown onto or applied in some other manner. The composite material thus produced is a very good substitute for textile material. It is strong and durable and relatively easy to manufacture.

---

For manufacturing a material similar to textile it has been suggested to impregnate a fibrous material having high porosity, for example non-woven fabric, with a resinous elastomer which is adhesive in dry state, such as plasticized rubber latex, polyisobutylene, polyvinylether, polyacryloether or equivalent polymer derivatives in a water dispersion, in which the water is at least partly removed after the impregnation so that an adhesive layer is formed which is then covered on one or both sides by being pressed together with stretchable, porous tissue paper, preferably crepe tissue paper, having a surface weight of 10–30 g./m.$^2$ and a crepe degree of 10–50%. According to a modification of this method, the covering tissue paper applied on one or both sides of the adhesive layer is replaced by fibres of cellulose or fibres of synthetic character which are blown onto or applied in some other manner to the adhesive layer and pressed together therewith.

However, with this method of manufacture the production rate is to a certain extent limited to the normal rate of, at the most, about 60 m./min. This is because most of the water in the dispersion must evaporate before the outer layer of tissue paper or fibres is applied.

Further, it is known from Swedish patent specifications No. 199,787 and 205,231 to manufacture material replacing textile by impregnating thin crepe tissue paper with a plastisol, i.e. finely divided or pulverized polyvinyl chloride suspended in an organic plasticizer which, after being applied to the tissue paper, is cured by contacting a cylinder heated to about 180° C. Due to the slow curing process of the plastisol where the material must be heated right through to at least 150–160 C. for a certain curing period, the production rate is even lower (about 30 m./min.), resulting in high manufacturing costs and small production quantities.

The main purpose of the present invention is to eliminate the factors limiting the rate of production and enabling an increased production from the above mentioned 30–60 m./min. to, say, 300–500 m./min. or more.

According to the invention two or more layers of material are joined together to form a composite material with the help of a plasticized, adhesive, resinous elastomer which is applied to one of the layers of material in molten state. The application of the adhesive is described in this specification and in the appended claims as coating of a base layer, the term "coating" being broad enough to include impregnation of the base material. Since the elastomer is adhesive the subsequent combination of the material layers may be carried out at room temperature, at which the resinous elastomer has high viscosity and cannot therefore penetrate into the outer, soft, stretchable tissue paper and make it stiff. Neither does the resinous elastomer contain water. Thus, the crepe degree of a crepe tissue paper will not be destroyed and the cellulose fibres do not become swollen. Since the elastomer is plasticized the various layers of material have such freedom of movement in relation to each other that this composite material is extremely soft and thus hangs well and has a satisfactory texture.

The molten, plasticized, adhesive, resinous elastomer may consist of a mixture of aromatic hydrocarbon, low molecular resins and plasticizers.

The aromatic hydrocarbon resins may be of any of the following types: petroleum hydrocarbon, alkyl aromatic hydrocarbon, styrene resins, styrene copolymer resins, styrene elastomer resins or terpene resins.

The low molecular resins may be low molecular polythenes or ethylene vinyl acetate copolymers.

Organic plasticizers such as phthalates, phosphates, oleates, glycols or adipates may be used as plasticizers.

In a test a resinous elastomeric composition was used consisting of 70 parts by weight of low molecular styrene resin having a molecular weight of 350 (for example "Piccolastic A–50" manufactured by Pennsylvania Industrial Chemical Corporation), 30 parts by weight of ethylene vinyl acetate copolymer containing 60% ethylene and 40% vinyl acetate, for example "Elvax 40," manufactured by E. I. du Pont Co., 20 parts by weight of dioctyl phthalate.

This mixture has a viscosity of 3.450 cp. when applied at a temperature of 120° C.

The carrier material for the resinous elastomer may be either soft crepe tissue paper having a crepe degree of 10–50% and a surface weight of approximately 10–50 g./m.$^2$ or some other fibrous material, for example nonwoven fabric having approximately the same surface weight. A dense or perforated plastic film of "low-density" polythene, "high-density" polythene, polypropylene or polyester type may also be used as carrier material.

The carrier material is combined on one or both sides by being pressed together with soft, stretchable, crepe tissue paper, preferably of sulphite pulp having a crepe degree of 10–50% and a surface weight of 10–50 g./m.$^2$. Since the resinous elastomer is applied in molten state there are no production-impeding factors in the form of drying times or curing times and it is not necessary to heat the material when it is combined with the outer paper because the elastomer is adhesive and thus adheres instantaneously to the outer tissue layers solely by means of pressure. In theory the synthetic textile material according to the invention can be manufactured at any rate.

Some embodiments of the invention will now be mentioned as examples, without in any way limiting the scope of the invention. The invention can thus be modified within the scope of the following claims.

EXAMPLE 1

A soft crepe tissue paper having a surface weight of 20 g./m.² and a crepe degree of approximately 30% is covered with 8–10 g./cm.² of a molten bath of plasticized resinous elastomer of the above-mentioned type at 120° C. with the help of an etched or stamped roller having approximately 150 lines per cm. and an etched depth of approximately 40 microns ($\mu$m.). The side(s) of the tissue paper covered with this resinous elastomer is (are) then covered with soft crepe tissue paper having a surface weight of approximately 20 g./cm.² and a crepe degree of approximately 30%. The lamination is carried out, for example, by compressing the material in a rolling press, for example consisting of one steel roller and one rubber roller. The finished material is then rolled up.

EXAMPLE 2

A material consisting of a soft crepe tissue paper, a non-woven fabric or a perforated plastic film having a surface weight of 15–20 g./m.² is coated with a plasticized resinous elastomer of the above-mentioned type at 120° C. with the help of an etched roller. The material is combined with a soft crepe tissue (20 g./m.², 30% crepe) by compressing the material in a rolling press, and subsequently the opposite side is coated in the same way with another 10 g./m.² of the same resinous elastomer and this layer also covered with a soft crepe tissue paper (20 g./m.², 30% crepe) by compressing the material in a rolling press. Finally the finished material is rolled up.

What I claim is:

1. In a method of manufacturing a material similar to textile the steps of:
   (a) providing a base layer selected from the group of materials consisting of: soft crepe tissue paper having a surface weight of from 10 to 50 g./m.² and a crepe degree of from 10 to 50%; non-woven fabric having high porosity and a surface weight of from 10 to 50 g./m.²; polythene plastic film; polypropylene plastic film; and polyester plastic film;
   (b) coating the base layer with an adhesive resinous elastomer in molten state to form an adhesive layer of said resinous elastomer on the surface of the base layer; and
   (c) subsequently covering said adhesive layer with an outer layer of fibrous material for producing a soft surface.

2. The method of claim 1 wherein the adhesive resinous elastomer is a plasticized mixture of an aromatic hydrocarbon polymer and a low molecular weight resin selected from the group consisting essentially of low molecular weight polythene and low molecular weight ethylene vinyl acetate copolymers.

3. The method of claim 1 wherein said outer layer is formed of stretchable, porous, crepe tissue paper and including pressing said outer layer on to said adhesive layer.

4. The method of claim 3 wherein said outer layer crepe tissue paper has a surface weight of from 10 to 50 g./m.² and a crepe degree of from 10% to 50%.

5. The method of claim 1 wherein said outer layer is formed by blowing fibres of cellulose on to a said adhesive layer.

6. The method of claim 1 wherein said outer layer is formed by blowing fibres of a synthetic character on to said adhesive layer.

7. The method of claim 1 wherein said adhesive layer and outer layer are applied to both sides of said base layer.

References Cited
UNITED STATES PATENTS

| | | | |
|---|---|---|---|
| 2,819,181 | 1/1958 | Thomas | 156—344 UX |
| 3,297,515 | 1/1967 | Regenstein et al. | 156—334 X |

CARL D. QUARFORTH, Primary Examiner

S. J. LECHERT, Jr., Assistant Examiner

U.S. Cl. X.R.

156—313, 324, 334